United States Patent
Hsieh

(10) Patent No.: US 8,422,817 B2
(45) Date of Patent: *Apr. 16, 2013

(54) METHOD AND APPARATUS FOR PERFORMING DE-NOISE PROCESSING

(75) Inventor: Chao-Kuei Hsieh, Taipei County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 305 days.

This patent is subject to a terminal disclaimer.

(21) Appl. No.: 12/938,349

(22) Filed: Nov. 2, 2010

(65) Prior Publication Data

US 2012/0045123 A1     Feb. 23, 2012

(30) Foreign Application Priority Data

Aug. 18, 2010   (TW) ................. 99127548 A

(51) Int. Cl.
- G06K 9/40  (2006.01)
- H04N 1/38  (2006.01)
- H04N 5/08  (2006.01)
- G09G 5/00  (2006.01)

(52) U.S. Cl.
USPC ............ 382/274; 358/463; 345/611; 348/533

(58) Field of Classification Search ................. 382/162, 382/173, 254, 266, 272, 274, 275, 305, 312, 382/167, 224; 358/463, 515, 518, 647; 345/597, 345/611; 348/294

See application file for complete search history.

(56) References Cited

U.S. PATENT DOCUMENTS

| | | | |
|---|---|---|---|
| 7,356,167 B2 * | 4/2008 | Kita .............................. | 382/112 |
| 7,800,661 B2 * | 9/2010 | Forutanpour ................. | 348/246 |
| 7,929,032 B2 * | 4/2011 | Tajima et al. ................. | 348/246 |
| 8,035,702 B2 * | 10/2011 | Sato et al. ..................... | 348/241 |
| 8,089,537 B2 * | 1/2012 | Hoshuyama et al. ......... | 348/246 |

* cited by examiner

*Primary Examiner* — Kanjibhai Patel
(74) *Attorney, Agent, or Firm* — Winston Hsu; Scott Margo

(57) ABSTRACT

A method for performing de-noise processing includes: with regard to each direction of a plurality of directions, summing up absolute values of differences between a plurality of sets of first pixel values around a target pixel of an image to generate a first detection value, and with regard to each direction of at least a portion of the directions, selectively averaging at least one set of second pixel values around the target pixel to generate a second detection value; sorting a plurality of pixel values around the target pixel and generating a third detection value accordingly; and with regard to a specific direction of the directions, performing de-noise processing on the target pixel according to at least the former two of the first detection value, the third detection value, and the second detection value. An associated apparatus is also provided.

20 Claims, 10 Drawing Sheets

METHOD AND APPARATUS FOR PERFORMING DE-NOISE PROCESSING

BACKGROUND OF THE INVENTION

1. Field of the Invention

The present invention relates to image processing of Bayer pattern images, and more particularly, to a method for performing de-noise processing and to an associated apparatus.

2. Description of the Prior Art

Typically, images generated by an image sensor of a personal computer (PC) camera (or a webcam) are Bayer pattern images. According to the related art, any sensing unit of the image sensor can generate a pixel value belonging to only a color channel within respective pixel values of a corresponding pixel. For example, complete color channels may comprise red, green, and blue color channels, and any sensing unit of the image sensor can merely generate one of red, green, and blue pixel values of a corresponding pixel, rather than all of the red, green, and blue pixel values. As a result, performing image processing is required for generating the other two pixel values within the red, green, and blue pixel values.

In order to save material costs, a conventional image processing circuit is typically implemented by utilizing low end hardware resources, causing many problems in the related art. For example, once the design thereof is oversimplified, some side effects may occur, and the image quality is poor. In another example, after the conventional image processing circuit performs image processing, obvious noise near edges may occur. Thus, a novel method is required for improving the image quality.

SUMMARY OF THE INVENTION

It is therefore an objective of the claimed invention to provide a method for performing de-noise (or denoise) processing, and to provide an associated apparatus, in order to solve the above-mentioned problems.

It is another objective of the claimed invention to provide a method for performing de-noise processing, and to provide an associated apparatus, in order to guarantee the image quality. Even in a situation where low end hardware resources are utilized for implementation, the present invention can still maintain high image quality.

According to a preferred embodiment of the claimed invention, a method for performing de-noise processing comprises: with regard to each direction of a plurality of directions, summing up absolute values of differences between a plurality of sets of first pixel values around a target pixel of an image to generate a first detection value, and with regard to each direction of at least one portion of the directions, selectively averaging at least one set of second pixel values around the target pixel to generate a second detection value, wherein each set of the sets of first pixel values comprises two pixel values corresponding to a difference, each set of the at least one set of second pixel values comprises two pixel values, two pixel values of a same set belong to a same color channel, and each set of first pixel values does not comprise a pixel value of the target pixel; sorting a plurality of pixel values around the target pixel and generating a third detection value accordingly, wherein the plurality of pixel values and the pixel value of the target pixel belong to a same color channel; and with regard to a specific direction of the directions, performing de-noise processing on the target pixel according to at least former two of the first detection value, the third detection value, and the second detection value.

While the method mentioned above is disclosed, an associated apparatus for performing de-noise processing is further provided. The apparatus comprises a processing circuit arranged to receive at least one image signal representing an image and perform de-noise processing on the image, wherein the processing circuit comprises a detection module and a de-noise module. With regard to each direction of a plurality of directions, the detection module sums up absolute values of differences between a plurality of sets of first pixel values around a target pixel of an image to generate a first detection value, and with regard to each direction of at least one portion of the directions, the detection module selectively averages at least one set of second pixel values around the target pixel to generate a second detection value, wherein each set of the sets of first pixel values comprises two pixel values corresponding to a difference, each set of the at least one set of second pixel values comprises two pixel values, two pixel values of a same set belong to a same color channel, and each set of first pixel values does not comprise a pixel value of the target pixel. In addition, the detection module sorts a plurality of pixel values around the target pixel and generates a third detection value accordingly, wherein the plurality of pixel values and the pixel value of the target pixel belong to a same color channel. Additionally, with regard to a specific direction of the directions, the de-noise module performs de-noise processing on the target pixel according to at least former two of the first detection value, the third detection value, and the second detection value.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
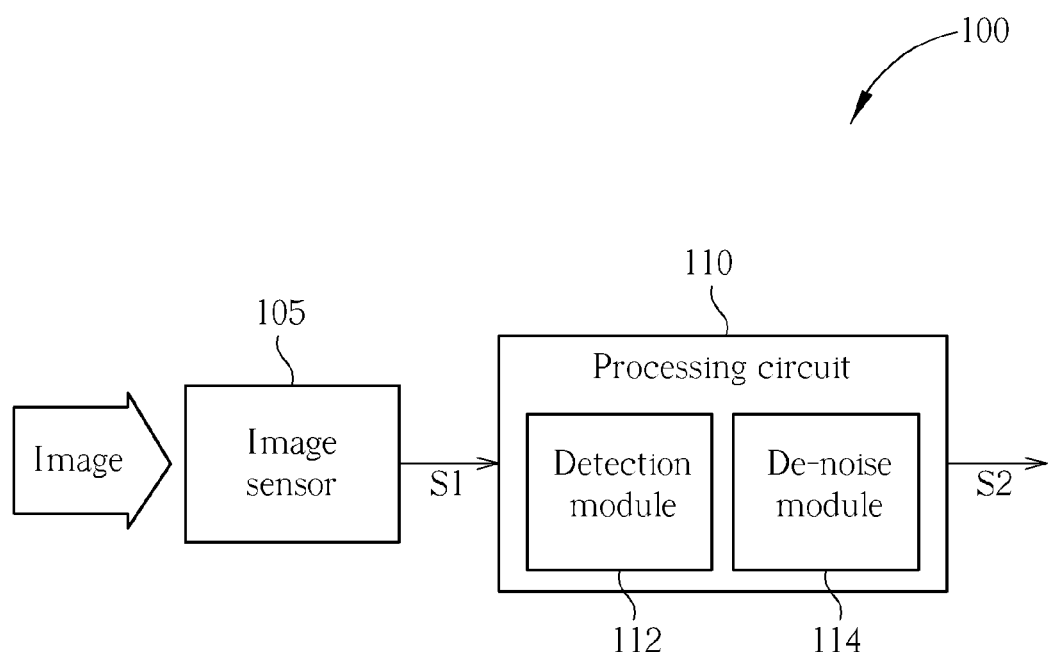
FIG. 1A is a diagram of an apparatus for performing de-noise processing according to a first embodiment of the present invention.

Please refer to FIG. 1A, which illustrates a diagram of an apparatus 100 for performing de-noise processing according to a first embodiment of the present invention. The apparatus 100 comprises an image sensor 105 and a processing circuit 110, and the processing circuit 110 comprises a detection module 112 and a de-noise module 114. According to this embodiment, the processing circuit 110 receives at least one image signal 51 representing an image from the image sensor 105, and performs de-noise processing on the image, where the image is a Bayer pattern image. As shown in FIG. 1A, the processing circuit 110 can output at least one image signal S2 carrying a de-noise image. In addition, the detection module 112 can perform detection to generate a plurality of detection values, and according to at least a portion of the detection values, the de-noise module 114 can selectively perform de-noise processing on a target pixel. In practice, the detection module 112 and the de-noise module 114 can be implemented by utilizing circuits. This is for illustrative purposes only, and is not meant to be a limitation of the present invention. According to some variations of this embodiment, such as a second embodiment shown in FIG. 1B, the aforementioned processing circuit 110 is replaced by a processing circuit 110', and the processing circuit 110' can execute a program code 110P to perform the same operations in the first embodiment, where the program code 110P comprises program modules such as the detection module 112' and the de-noise module 114', which are equipped with the capability of performing the operations of the detection module 112 and the de-noise module 114, respectively. In response to the change in architecture, the numeral 100 is replaced by the numeral 100' in the second embodiment.

Figure 1B:
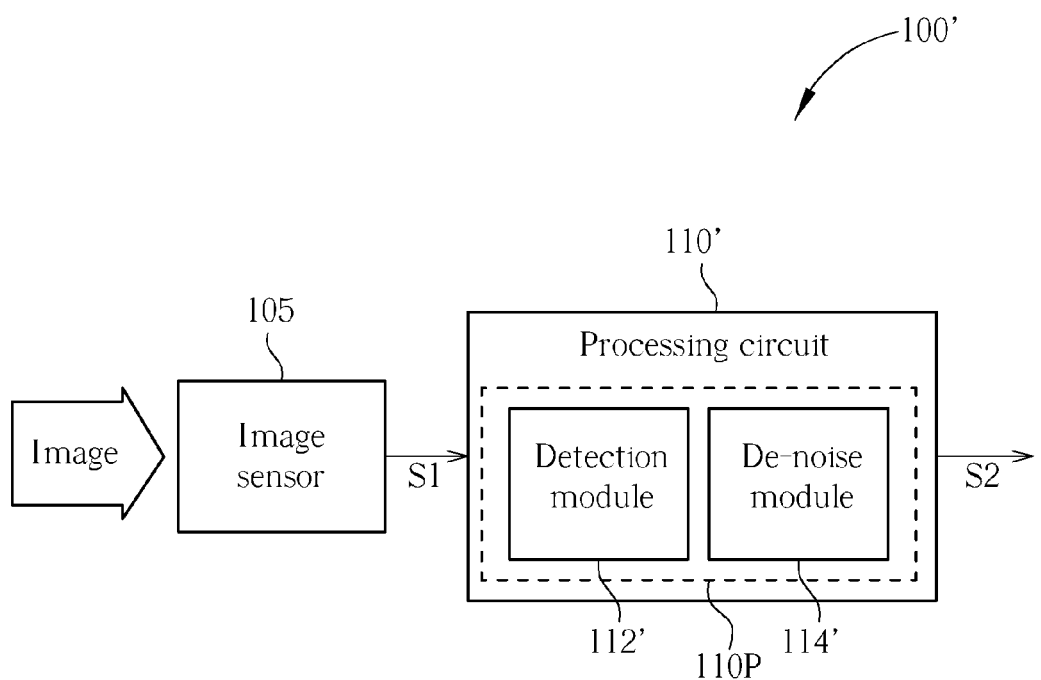
FIG. 1B is a diagram of an apparatus for performing de-noise processing according to a second embodiment of the present invention.

No matter whether the architecture shown in FIG. 1A or the architecture shown in FIG. 1B is utilized for implementation, the present invention can prevent the related art problems such as the problem of poor image quality. More particularly, the present invention can properly perform de-noise processing. Even in a situation where low end hardware resources are utilized for implementation, the present invention can still maintain high image quality. Please refer to FIG. 2 for related details of de-noise processing.

Figure 2:
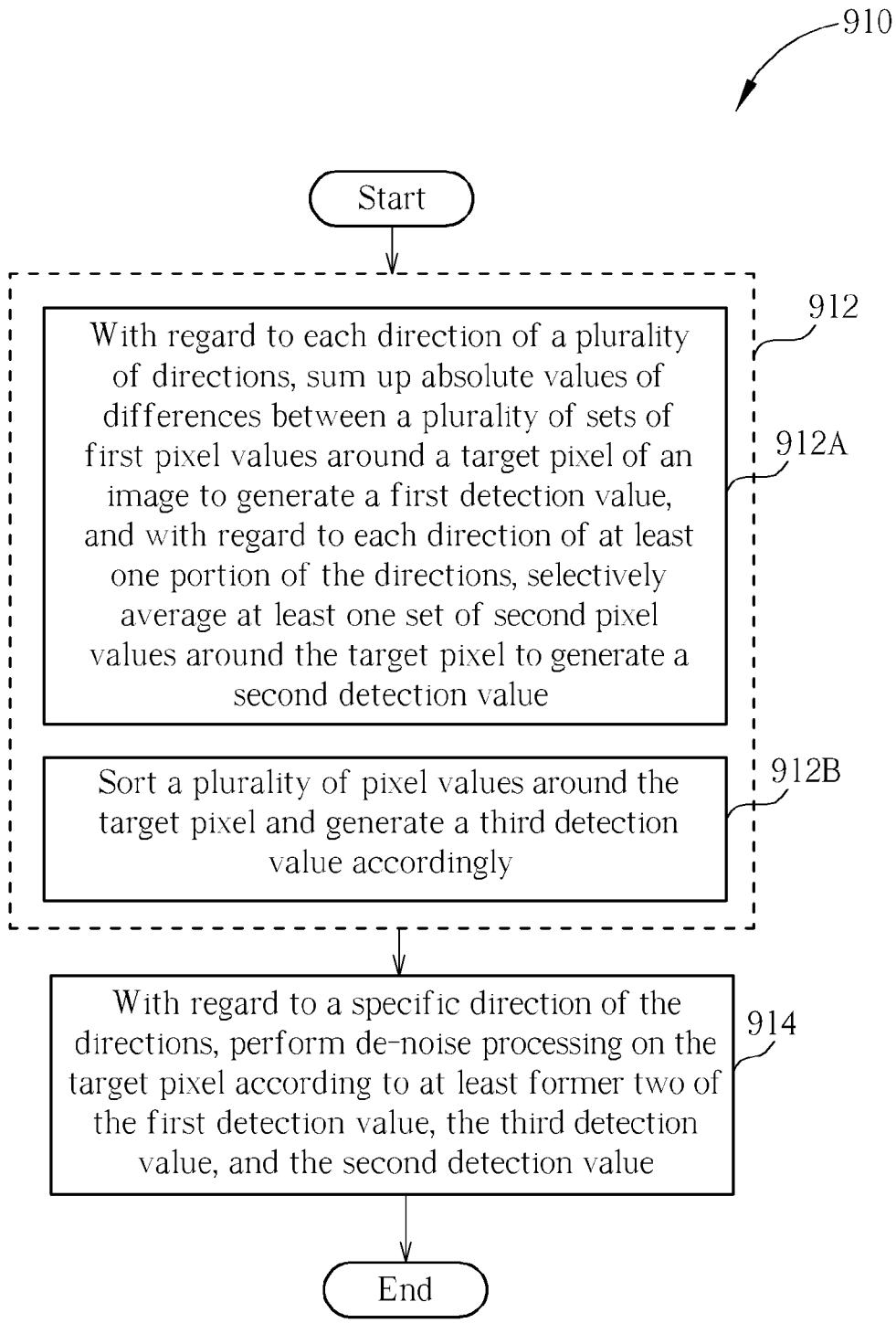
FIG. 2 is a flowchart of a method for performing de-noise processing according to an embodiment of the present invention.

FIG. 2 is a flowchart of a method 910 for performing de-noise processing according to an embodiment of the present invention. The method 910 can be applied to the apparatus 100 shown in FIG. 1A (or the apparatus 100' shown in FIG. 1B), and more particularly, to the processing circuit 110 of the first embodiment (or the processing circuit 110' of the second embodiment). For simplicity, the architecture of the first embodiment is utilized in the descriptions of this embodiment, where these descriptions are also suitable for the architecture of the second embodiment. The method 910 is described as follows.

In Step 912, the detection module 112 executes Step 912A and Step 912B. For example, Step 912A and Step 912B can be performed in parallel. In another example, the detection module 112 may execute Step 912A first and then execute Step 912B. In another example, the detection module 112 may execute Step 912B first and then execute Step 912A. In another example, the detection module 112 may alternatively execute a portion of Step 912A and a portion of Step 912B.

In Step 912A, with regard to each direction of a plurality of directions, the detection module 112 sums up absolute values of differences between a plurality of sets of first pixel values around a target pixel of an image (e.g. the aforementioned Bayer pattern image) to generate a first detection value, and with regard to each direction of at least one portion of the directions (e.g. each direction of the directions), the detection module 112 selectively averages at least one set of second pixel values around the target pixel to generate a second detection value. That is, the first detection value is the summation of the absolute values of the differences between the sets of first pixel values, and the second detection value is the average of the aforementioned at least one set of second pixel values. More particularly, each set of the sets of first pixel values comprises two pixel values corresponding to a difference, each set of the aforementioned at least one set of second pixel values comprises two pixel values, and two pixel values of the same set belong to the same color channel. In addition, each set of first pixel values does not comprise a pixel value of the target pixel.

In Step 912B, the detection module 112 sorts a plurality of pixel values around the target pixel and generates a third detection value accordingly, where the plurality of pixel values and the pixel value of the target pixel belong to the same color channel. More particularly, the third detection value can be equal to or similar to the median of the plurality of pixel values. For example, in a situation where the number of the plurality of pixel values is an odd number, the third detection value can be the central pixel value within the sorted result of the plurality of pixel values. In another example, in a situation where the number of the plurality of pixel values is an even number, the third detection value can be the average of the central two pixel values within the sorted result of the plurality of pixel values.

In Step 914, with regard to a specific direction of the directions, the de-noise module 114 performs de-noise processing on the target pixel according to at least the former two of the first detection value, the third detection value, and the second detection value. In practice, the de-noise module 114 can select the specific direction from the directions according to the first detection value of each direction of the directions, and then, with regard to the specific direction, the de-noise module 114 can perform de-noise processing on the target pixel according to at least the former one of the third detection value and the second detection value of the specific direction. For example, the first detection value of each direction may represent a detection value of image uniformity around the target pixel, and according to the magnitude of respective first detection values of the respective directions, the de-noise module 114 can determine a direction of a possible edge and/or stroke near the target pixel and utilize this direction as the specific direction mentioned above.

In this embodiment, the directions comprise N directions, such as the directions {DN(n)}, where N is a positive integer, and n=1, 2, . . . , or N. For example, in a situation where N=4, the directions DN(1), DN(2), DN(3), and DN(4) may represent the horizontal direction, the 45-degree direction, the vertical direction, and the 135-degree direction, respectively. For better comprehension, four parameters Horz, D45, Vert, and D135 are respectively defined as 1, 2, 3, and 4, which are the four indexes 1, 2, 3, and 4 of the directions DN(1), DN(2), DN(3), and DN(4), for use of indicating the horizontal direction, the 45-degree direction, the vertical direction, and the 135-degree direction in the pseudo codes of the following descriptions, respectively.

FIGS. 3-6 respectively illustrate some implementation details of the method 910 shown in FIG. 2 according an embodiment of the present invention, where the circles illustrated in FIGS. 3-6 represent pixels, and the notations in the respective circles, such as the sets {{V00, V01, V02, V03, V04}, {V10, V11, V12, V13, V14}, {V20, V21, V22, V23, V24}, {V30, V31, V32, V33, V34}, {V40, V41, V42, V43, V44}}, represent pixel values. Please note that, in each of FIGS. 3-6, the central pixel (whose pixel value is V22) is the target pixel mentioned in Step 912A. In addition, the arrows shown in FIGS. 3-6 are utilized for indicating some possible sets of pixel values that may be selected as the respective sets of first pixel values mentioned in Step 912A, and each arrow corresponds to a set of pixel values, i.e. the "two pixel values corresponding to a difference" mentioned in Step 912A. For example, as the image of this embodiment is a Bayer pattern image, in a situation where the pixel value V22 is a blue pixel value, the locations of the respective arrows shown in FIGS.

3-6 exactly comply with the sentence "two pixel values of the same set belong to the same color channel" mentioned in Step 912A.

Figure 3:
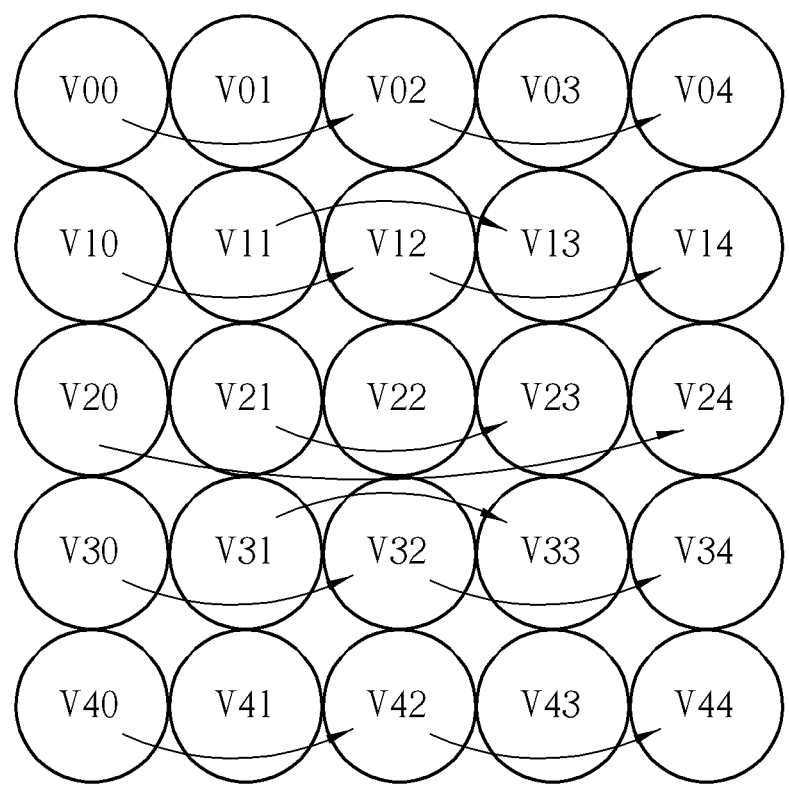
FIGS. 3-6 respectively illustrate some implementation details of the method shown in FIG. 2 according an embodiment of the present invention.

FIG. 3 illustrate a situation where the direction DN(n) is the horizontal direction DN(Horz) (i.e. n=Horz in FIG. 3), where some pseudo codes involved with the situation of FIG. 3 are listed as follows:

```
Det1[Horz] = abs(V10−V12)+abs(V12−V14)+
    abs(V11−V13)+abs(V31−V33)+
    abs(V20−V24)+abs(V21−V23)+
    abs(V30−V32)+abs(V32−V34);
Det1a[Horz] = abs(V00−V02)+abs(V02−V04)+
    abs(V40−V42)+abs(V42−V44);
if (mode==0) {
Det1[Horz] = Det1[Horz]*3/2;
} else if (mode==1) {
Det1[Horz] += Det1a[Horz];
}
Det2[Horz] = (V20+V24)/2;
```

In the above pseudo codes, the notation "abs" in the first several lines represents absolute values, and linear combinations of these absolute values, such as Det1[n] and Det1a[n] (where n=Horz in FIG. 3), can be utilized for generating the first detection value mentioned in Step 912. For example, in a mode M1 (i.e., in a situation where "mode==1" is true), the first detection value can be the summation of the twelve absolute values in the first six lines of the above pseudo codes. In another example, in a mode M0 (i.e., in a situation where "mode==0" is true), the first detection value can be (3/2) times the summation of the eight absolute values in the first four lines of the above pseudo codes, where the magnification factor (3/2) is utilized for adjusting the first detection value to make the first detection value suitable for calculations of both modes, and therefore, the calculation loads and related costs can be reduced. Thus, after completing the operations represented by the first eleven lines of the above pseudo codes, the notation Det1[n] (where n=Horz in FIG. 3) may represent the first detection value mentioned in Step 912A.

Please note that, as disclosed by the arrows shown in FIG. 3, with regard to each direction DN(n) of the directions mentioned in Step 912A, such as the horizontal direction DN(1), the sets of first pixel values correspond to pixels on at least three straight lines arranged according to the direction. For example, in the mode M0, with regard to each direction DN(n) of the directions mentioned in Step 912A, such as the horizontal direction DN(1), the sets of first pixel values correspond to pixels on three straight lines arranged according to the direction. In another example, in the mode M1, with regard to each direction DN(n) of the directions mentioned in Step 912A, such as the horizontal direction DN(1), the sets of first pixel values correspond to pixels on five straight lines arranged according to the direction.

In addition, with regard to each direction DN(n) of the at least one portion of the directions mentioned in Step 912A, such as the horizontal direction DN(1), the aforementioned at least one set of second pixel values corresponds to pixels on a straight line arranged according to the direction. For example, the aforementioned at least one set of second pixel values comprises pixel values V20 and V24.

Additionally, in the last line of the above pseudo codes, the notation Det2[n] (where n=Horz in FIG. 3) represents the second detection value mentioned in Step 912A. Suppose that the specific direction mentioned in Step 914 is the direction DN(n0) in a situation where n=n0. In Step 914, the de-noise module 114 performs de-noise processing on the target pixel according to a candidate value Cand, where the candidate value Cand can be selected from the second detection value Det2[n] (e.g. n=n0) or the third detection value (such as the third detection value Det3).

Figure 4:
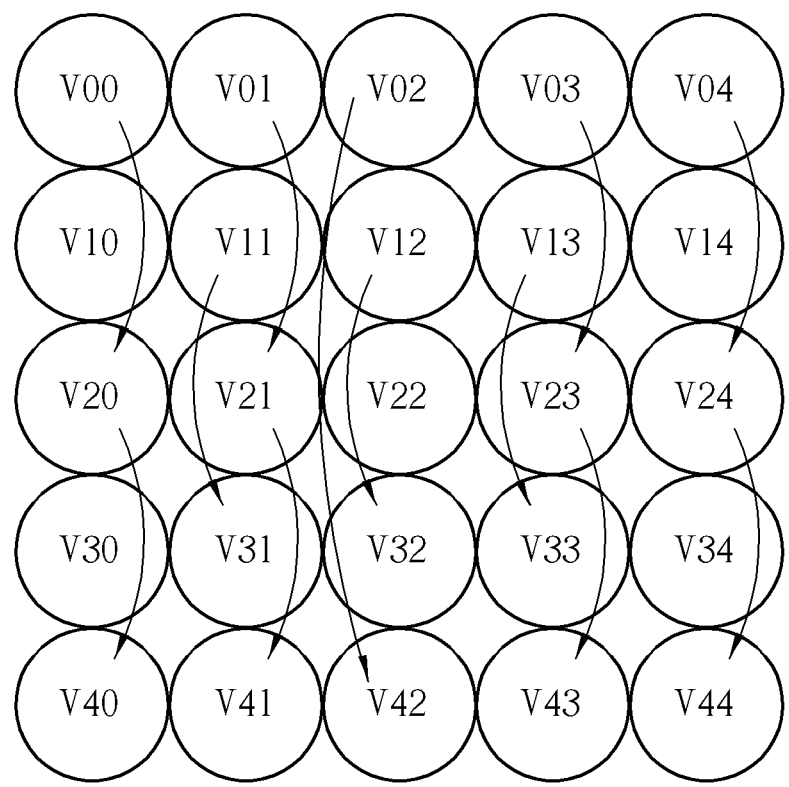

FIG. 4 illustrate a situation where the direction DN(n) is the vertical direction DN(Vert) (i.e. n=Vert in FIG. 4), where some pseudo codes involved with the situation of FIG. 4 are listed as follows:

```
Det1[Vert] = abs(V01−V21)+abs(V21−V41)+
    abs(V11−V31)+abs(V13−V33)+
    abs(V02−V42)+abs(V12−V32)+
    abs(V03−V23)+abs(V23−V43);
Det1a[Vert] = abs(V00−V20)+abs(V20−V40)+
    abs(V04−V24)+abs(V24−V44);
if (mode==0) {
Det1[Vert] = Det1[Vert]*3/2;
} else if (mode==1) {
Det1[Vert] +=  Det1a[Vert];
}
Det2[Vert] = (V02+V42)/2;
```

In the above pseudo codes, in response to the situation where n=Vert, the respective pixel values that can probably be utilized for calculating the first detection value mentioned in Step 912A are replaced, and the respective pixel values that can probably be utilized for calculating the second detection value mentioned in Step 912A are replaced, where the locations of the respective arrows are correspondingly changed in FIG. 4, for indicating some possible sets of first pixel values that may be utilized. Similar descriptions are not repeated in detail for FIG. 4.

Figure 5:
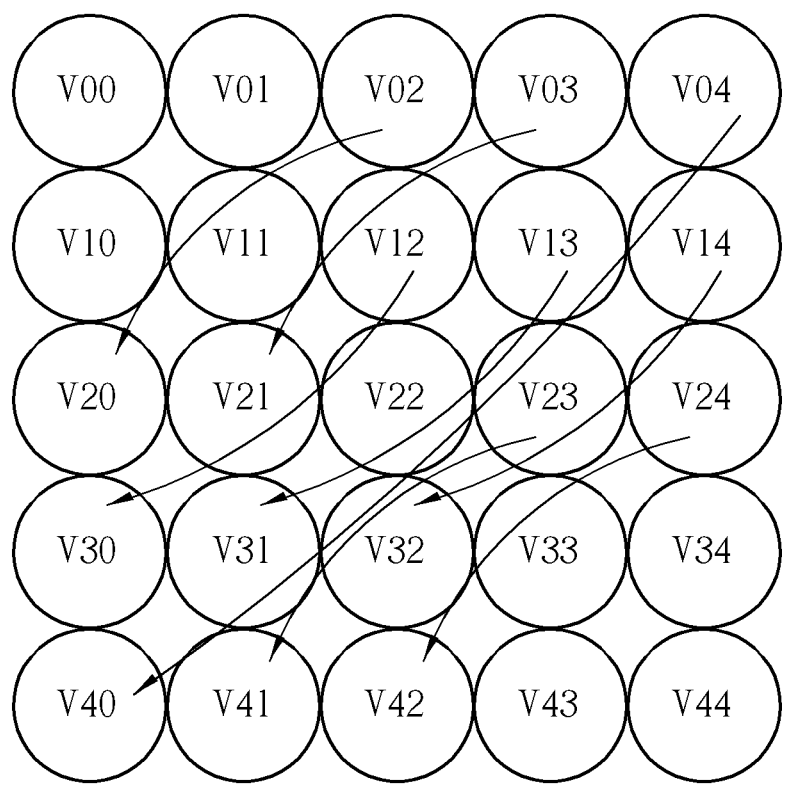

FIG. 5 illustrate a situation where the direction DN(n) is the 45-degree direction DN(D45) (i.e. n=D45 in FIG. 5), where some pseudo codes involved with the situation of FIG. 5 are listed as follows:

```
Det1[D45] = abs(V02−V20)+abs(V03−V21)+
    abs(V12−V30)+abs(V14−V32)+
    abs(V13−V31)+abs(V04−V40)+
    abs(V23−V41)+abs(V24−V42);
Det1[D45] =Det1[D45]*3/2;
Det2[D45] = (V04+V40)/2;
```

In the above pseudo codes, in response to the situation where n=D45, the respective pixel values that can probably be utilized for calculating the first detection value mentioned in Step 912A are replaced, and the respective pixel values that can probably be utilized for calculating the second detection value mentioned in Step 912A are replaced, where the locations of the respective arrows are correspondingly changed in FIG. 5, for indicating some possible sets of first pixel values that may be utilized. Similar descriptions are not repeated in detail for FIG. 5.

Figure 6:
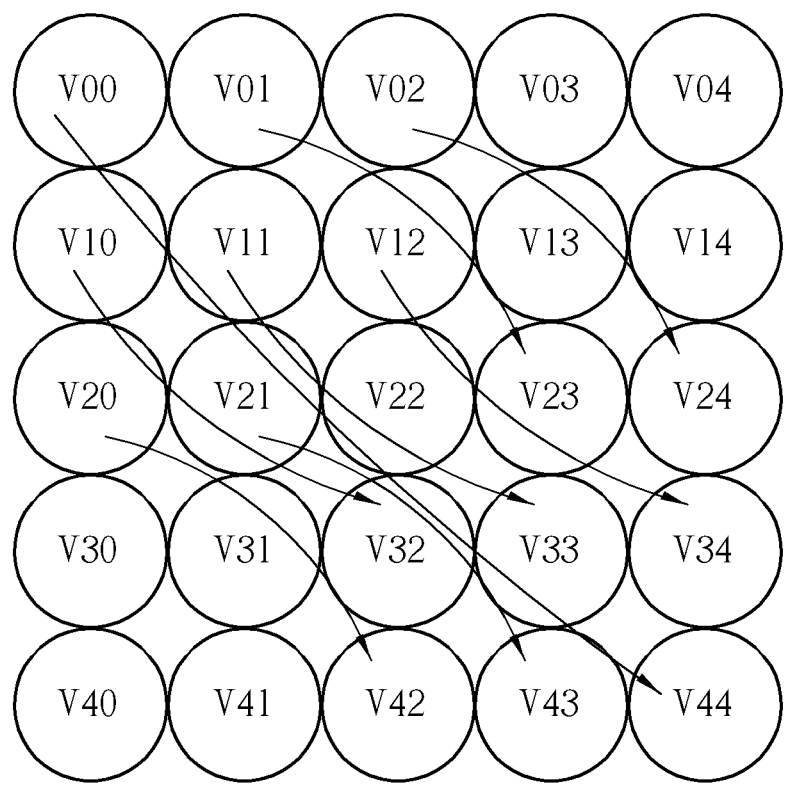

FIG. 6 illustrate a situation where the direction DN(n) is the 135-degree direction DN(D135) (i.e. n=D135 in FIG. 6), where some pseudo codes involved with the situation of FIG. 6 are listed as follows:

```
Det1[D135] = abs(V01−V23)+abs(V02−V24)+
    abs(V10−V32)+abs(V12−V34)+
    abs(V11−V33)+abs(V00−V44)+
    abs(V20−V42)+abs(V21−V43);
```

-continued

```
Det1[D135] = Det1D135*3/2;
Det2[D135] = (V00+V44)/2;
```

In the above pseudo codes, in response to the situation where n=D135, the respective pixel values that can probably be utilized for calculating the first detection value mentioned in Step 912A are replaced, and the respective pixel values that can probably be utilized for calculating the second detection value mentioned in Step 912A are replaced, where the locations of the respective arrows are correspondingly changed in FIG. 6, for indicating some possible sets of first pixel values that may be utilized. Similar descriptions are not repeated in detail for FIG. 6.

Figure 7:
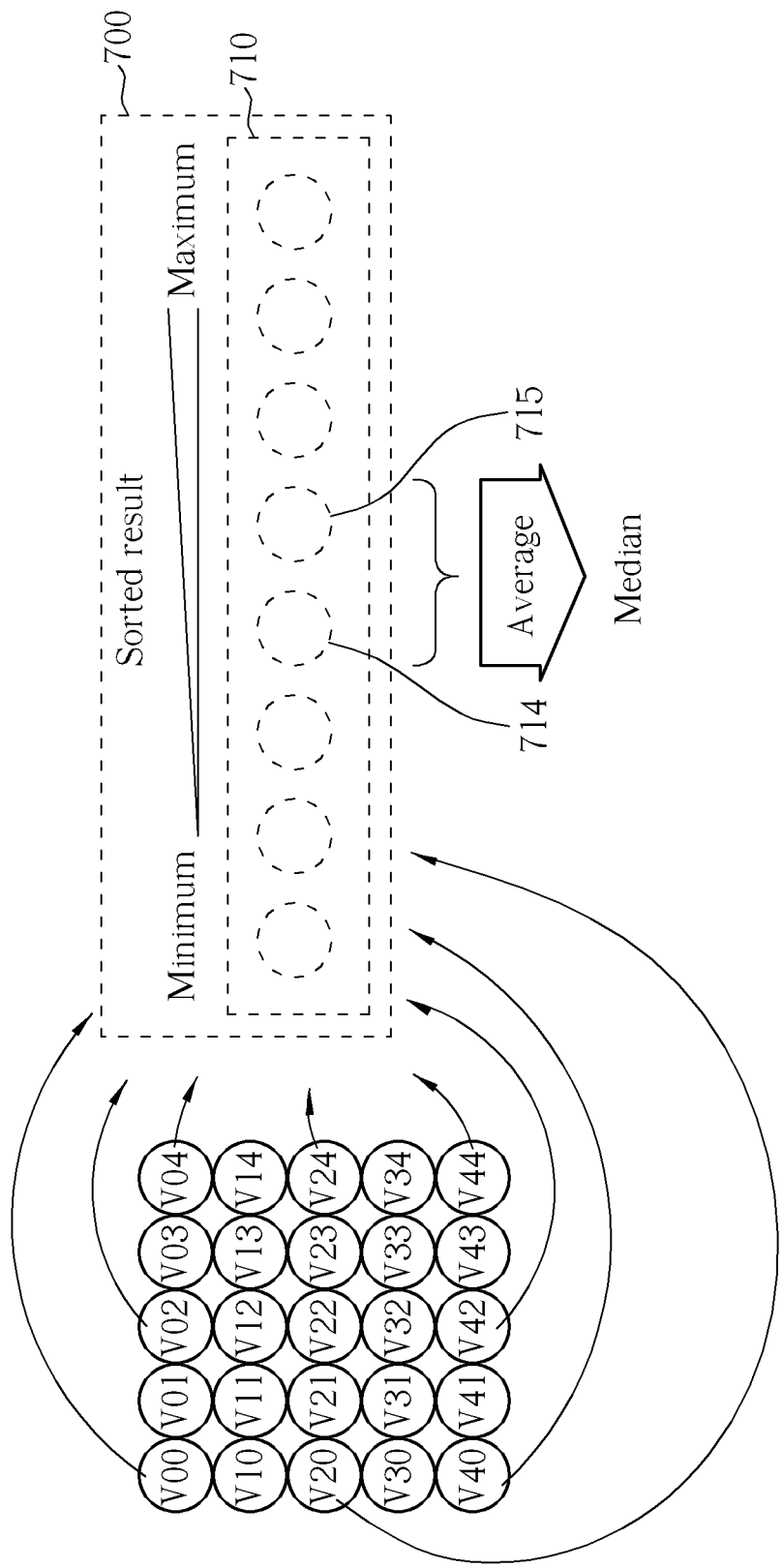
FIG. 7 illustrates some implementation details of the method shown in FIG. 2 according an embodiment of the present invention.

According to this embodiment, the de-noise module 114 selects the direction DN(n0) whose first detection value is the minimum of the respective first detection values {Det1[n]} from the directions {DN(n)} as the specific direction, which means the first detection values Det1[n0] is the minimum of the respective first detection values {Det1[n]} of the respective directions {DN(n)}. Thus, the specific direction mentioned in Step 914 is the direction DN(n0) in the situation where n=n0, and with some condition(s) being satisfied, the de-noise module 114 can perform de-noise processing on the target pixel according to the second detection value Det2[n0] of the specific direction DN(n0). For example, the de-noise module 114 can determine whether the third detection value Det3 falls within the range of a first interval Int(1). When it is detected that the third detection value Det3 falls within the range of the first interval Int(1), the de-noise module 114 performs de-noise processing on the target pixel according to the second detection value Det2[n0] of the specific direction DN(n0); otherwise, the de-noise module 114 performs de-noise processing on the target pixel according to the third detection value Det3. More particularly, the de-noise module 114 can determine whether the third detection value Det3 falls within any of the range of the first interval Int(1), the range of a second interval Int(2), and the range of a third interval Int(3), where a continuous range can be formed with the intervals Int(1), Int(2), and Int(3), and the first interval Int(1) corresponds a greater possible value of the third detection value Det3 and the third interval Int(3) corresponds to a smaller possible value of the third detection value Det3. When it is detected that the third detection value Det3 falls within the range of the second interval Int(2) or the range of the third interval Int(3), the de-noise module 114 performs de-noise processing on the target pixel according to the third detection value Det3. In this embodiment, the third detection value Det3 is equal to the median of the plurality of pixel values mentioned in Step 912B. For example, in a situation where the plurality of pixel values comprises pixel values {V00, V02, V04, V20, V24, V40, V42, V44} (as disclosed in FIG. 7), the third detection value Det3 can be expressed as follows:

$$Det3=med(V00,V02,V04,V20,V24,V40,V42,V44);$$

where the notation "med" represent the median. In the situation shown in FIG. 7, the number of the plurality of pixel values is an even number, so the third detection value Det3 can be the average of the central two pixel values 714 and 715 of the respective pixel values 710 within the sorted result 700 of the plurality of pixel values {V00, V02, V04, V20, V24, V40, V42, V44}.

In practice, the de-noise module 114 can mix the candidate value Cand with the pixel value of the target pixel according to a weighted value W to update the pixel value of the target pixel, in order to perform de-noise processing on the target pixel, where the candidate value Cand can be selected from the second detection value Det2[n0] of the specific direction DN(n0) or the third detection value Det3. For example, the de-noise module 114 can update the pixel value of the target pixel according to the following equation:

$$Pixel\_Ori'=Pixel\_Ori*(1-W)+Cand*(W);$$

where the notation Pixel_Ori represents the pixel value of the target pixel before de-noise processing, and the notation Pixel_Ori' represents the pixel value of the target pixel after de-noise processing.

In addition, when it is detected that the third detection value Det3 falls within the range of the first interval Int(1), the de-noise module 114 selects the second detection value Det2[n0] of the specific direction DN(n0) as the candidate value Cand, and determines the magnitude of the weighted value W according to the magnitude of the third detection value Det3. When it is detected that the third detection value Det3 falls within the range of the second interval Int(2) or the range of the third interval Int(3), the de-noise module 114 selects the third detection value Det3 as the candidate value Cand. More particularly, when it is detected that the third detection value Det3 falls within the range of the second interval Int(2), the de-noise module 114 sets the weighted value W as a second predetermined weighted value W2. When it is detected that the third detection value Det3 falls within the range of the third interval Int(3), the de-noise module 114 sets the weighted value W as a third predetermined weighted value W3. For example, $1 \geq W3 \geq W2 \geq 0$. This is for illustrative purposes only, and is not meant to be a limitation of the present invention. According to some variations of this embodiment, when it is detected that the third detection value Det3 falls within the range of the first interval Int(1), the de-noise module 114 can select the third detection value Det3 as the candidate value Cand. More particularly, in these variations, when it is detected that the third detection value Det3 falls within the range of the first interval Int(1), the de-noise module 114 can set the weighted value W as a first predetermined weighted value W1. For example, $1 \geq W3 \geq W2 \geq W1 \geq 0$.

Figure 8A:
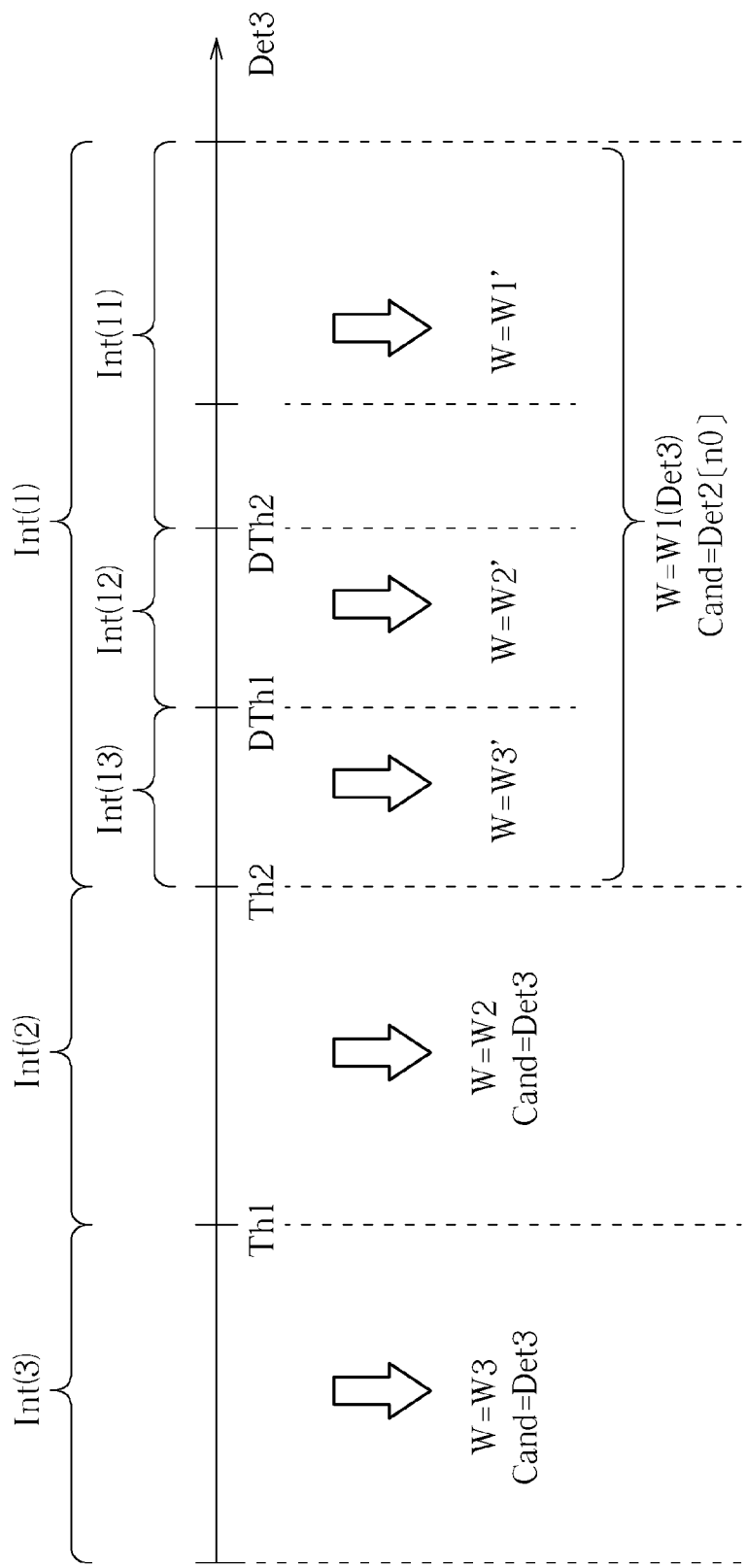
FIGS. 8A-8B respectively illustrate some implementation details of the method shown in FIG. 2 according an embodiment of the present invention.
Figure 8B:
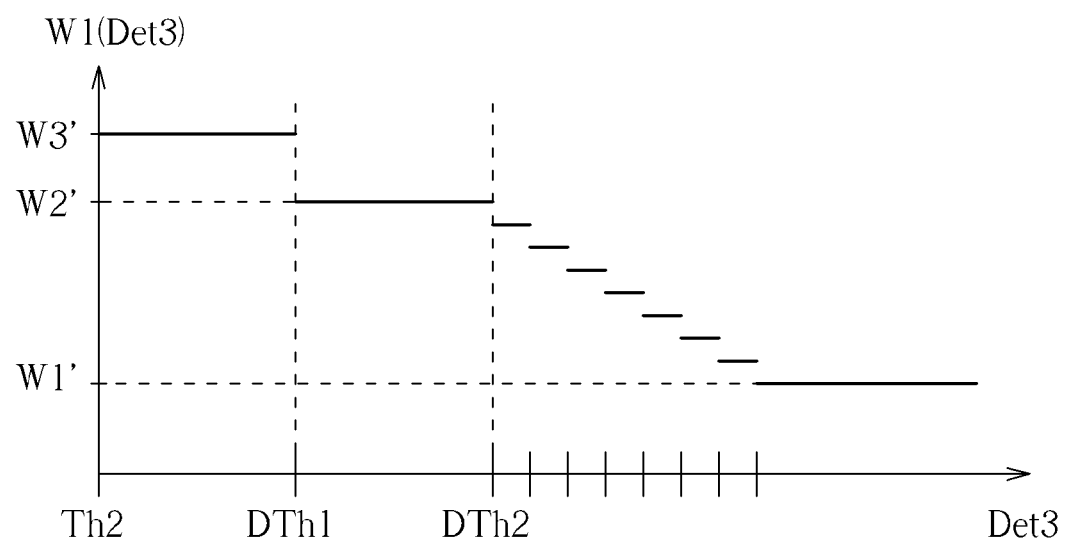

FIGS. 8A-8B respectively illustrate some implementation details of the method 910 shown in FIG. 2 according an embodiment of the present invention, with the first interval Int(1), the second interval Int(2), and the third interval Int(3) corresponding to a situation where a strong boundary is detected (e.g. there is obviously an edge in the region near the target pixel), a situation where a weak boundary is detected (e.g. there is probably an edge in the region near the target pixel), and a situation where a uniform region is detected (e.g. pixel values in the region near the target pixel vary slightly), respectively.

As shown in FIG. 8A, according to threshold values Th1 and Th2, the de-noise module 114 can determine whether the third detection value Det3 falls within the range of the first interval Int(1), the range of the second interval Int(2), or the range of the third interval Int(3). For example, when it is detected that the third detection value Det3 is greater than the threshold value Th2, the de-noise module 114 can determine that the third detection value Det3 falls within the range of the first interval Int(1). In another example, when it is detected that the third detection value Det3 is less than the threshold value Th1, the de-noise module 114 can determine that the third detection value Det3 falls within the range of the third interval Int(3). Similarly, with regard to a plurality of sub-intervals within the first interval Int(1), such as sub-intervals Int(11), Int(12), and Int(13), according to threshold values DTh1 and DTh2, the de-noise module 114 can determine whether the third detection value Det3 falls within the range of the sub-interval Int(11), the range of the sub-interval Int (12), or the range of the sub-interval Int(13).

According to this embodiment, when it is detected that the third detection value Det3 falls within the range of the first interval Int(1), the de-noise module 114 selects the second detection value Det2[n0] of the specific direction DN(n0) as the candidate value Cand, and sets the weighted value W as a first predetermined weighted value function W1(Det3) according to the third detection value Det3, where FIG. 8B illustrates an exemplary curve of the first predetermined weighted value function W1(Det3), with the curve being formed with a plurality of levels. In addition, when it is detected that the third detection value Det3 falls within the range of the second interval Int(2), the de-noise module 114 selects the third detection value Det3 as the candidate value Cand, and sets the weighted value W as the second predetermined weighted value W2. Additionally, when it is detected that the third detection value Det3 falls within the range of the third interval Int(3), the de-noise module 114 selects the third detection value Det3 as the candidate value Cand, and sets the weighted value W as the third predetermined weighted value W3. For example, $1 \geq W3 \geq W2 \geq W1(Det3) \geq 0$.

As shown in FIG. 8B, when it is detected that the third detection value Det3 falls within the range of the sub-interval Int(13) shown in FIG. 8A, the de-noise module 114 sets the weighted value W as a predetermined weighted value W3'. In addition, when it is detected that the third detection value Det3 falls within the range of the sub-interval Int(12) shown in FIG. 8A, the de-noise module 114 sets the weighted value W as a predetermined weighted value W2'. Additionally, when it is detected that the third detection value Det3 falls within the range of the sub-interval Int(11) shown in FIG. 8A, according to the magnitude of the third detection value Det3, the de-noise module 114 can set the weighted value W as a predetermined weighted value W1', or set the weighted value W as a value between the predetermined weighted values W1' and W2'. For example, $W2 \geq W3' \geq W2' \geq W1' \geq 0$.

More specifically, in a situation where the third detection value Det3 falls within the range of the sub-interval Int(11) shown in FIG. 8A, the levels represented by the possible function values of the first predetermined weighted value function W1(Det3) include eight levels. As shown in FIG. 8B, the eight levels are uniformly distributed in the vertical direction, and the first seven levels of the eight levels (i.e. the seven levels near the threshold value DTh2) are uniformly distributed in the horizontal direction. This is for illustrative purposes only, and is not meant to be a limitation of the present invention. According to some variations of this embodiment, at least a portion (e.g. a portion or all) of the eight levels has no need to be uniformly distributed in the vertical direction, and/or at least a portion (e.g. a portion or all) of the eight levels has no need to be uniformly distributed in the horizontal direction. According to some variations of this embodiment, the curve of the first predetermined weighted value function W1(Det3) can be varied. For example, the curve of the first predetermined weighted value function W1(Det3) can be a continuous curve.

According to a variation of this embodiment, in a situation where the third detection value Det3 falls within the range of the sub-interval Int(11) shown in FIG. 8A, the levels represented by the possible function values of the first predetermined weighted value function W1(Det3) may include $2^P$ levels, where the notation P represents a positive integer. In practice, the design that causes the number of levels represented by the possible function values of the first predetermined weighted value function W1(Det3) within the sub-interval Int(11) to be $2^P$ is helpful for simplifying architecture and saving costs. According to another variation of this embodiment, in a situation where the third detection value Det3 falls within the range of the sub-interval Int(11) shown in FIG. 8A, the number of levels represented by the possible function values of the first predetermined weighted value function W1(Det3) has no need to be $2^P$.

Please note that, according to the embodiment shown in FIGS. 3-6, with regard to each direction of the directions, the detection module 112 averages at least one set of second pixel values around the target pixel to generate the second detection value in Step 912A. This is for illustrative purposes only, and is not meant to be a limitation of the present invention. According to some variations of this embodiment, with regard to the specific direction, the detection module 112 averages at least one set of second pixel values around the target pixel to generate the second detection value in Step 912A. That is, in Step 912A, with regard to other directions of the plurality of directions (i.e. other directions within the plurality of directions, except for the specific direction), the detection module 112 of these variations has no need to calculate any second detection value.

According to some variations of this embodiment, the calculation regarding the second detection value in Step 912A can selectively be performed. More specifically, the calculation regarding the second detection value in Step 912A can be performed when needed. For example, when the second detection value (and more particularly, the second detection value of the specific direction) is needed for use of performing the de-noise processing of Step 914, with regard to the specific direction, the detection module 112 averages at least one set of second pixel values around the target pixel to generate the second detection value. In particular, the detection module 112 of these variations has no need to calculate any second detection value with regard to any direction in Step 912A, and the detection module 112 averages at least one set of second pixel values around the target pixel to generate the second detection value with regard to the specific direction only when the second detection value is needed for use of performing the de-noise processing of Step 914.

It is an advantage of the present invention that the present invention can prevent the related art problems such as the problem of poor image quality. More particularly, the present invention can properly perform de-noise processing. Even in a situation where low end hardware resources are utilized for implementation, the present invention can still maintain high image quality.

Those skilled in the art will readily observe that numerous modifications and alterations of the device and method may be made while retaining the teachings of the invention.

What is claimed is:

1. A method for performing de-noise processing, the method comprising:
   with regard to each direction of a plurality of directions, summing up absolute values of differences between a plurality of sets of first pixel values around a target pixel of an image to generate a first detection value, and with regard to each direction of at least one portion of the directions, selectively averaging at least one set of second pixel values around the target pixel to generate a second detection value, wherein each set of the sets of first pixel values comprises two pixel values corresponding to a difference, each set of the at least one set of second pixel values comprises two pixel values, two pixel values of a same set belong to a same color channel, and each set of first pixel values does not comprise a pixel value of the target pixel;

sorting a plurality of pixel values around the target pixel and generating a third detection value accordingly, wherein the plurality of pixel values and the pixel value of the target pixel belong to a same color channel; and with regard to a specific direction of the directions, performing de-noise processing on the target pixel according to at least former two of the first detection value, the third detection value, and the second detection value.

2. The method of claim 1, wherein with regard to each direction of the directions, the sets of first pixel values correspond to pixels on at least three straight lines arranged according to the direction.

3. The method of claim 1, wherein with regard to each direction of the at least one portion of the directions, the at least one set of second pixel values corresponds to pixels on a straight line arranged according to the direction.

4. The method of claim 1, wherein the step of performing de-noise processing on the target pixel according to at least the former two of the first detection value, the third detection value, and the second detection value further comprises:

selecting the specific direction from the directions according to the first detection value of each direction of the directions.

5. The method of claim 1, wherein the step of performing de-noise processing on the target pixel according to at least the former two of the first detection value, the third detection value, and the second detection value further comprises:

determining whether the third detection value falls within a range of a first interval; and when it is detected that the third detection value falls within the range of the first interval, performing de-noise processing on the target pixel according to the second detection value of the specific direction.

6. The method of claim 5, wherein the step of performing de-noise processing on the target pixel according to at least the former two of the first detection value, the third detection value, and the second detection value further comprises:

when it is detected that the third detection value falls within the range of the first interval, performing de-noise processing on the target pixel according to the second detection value of the specific direction; otherwise, performing de-noise processing on the target pixel according to the third detection value.

7. The method of claim 1, wherein the step of performing de-noise processing on the target pixel according to at least the former two of the first detection value, the third detection value, and the second detection value further comprises:

mixing a candidate value with the pixel value of the target pixel according to a weighted value to update the pixel value of the target pixel, in order to perform de-noise processing on the target pixel, wherein the candidate value is selected from the second detection value of the specific direction or the third detection value.

8. The method of claim 7, wherein the step of performing de-noise processing on the target pixel according to at least the former two of the first detection value, the third detection value, and the second detection value further comprises:

when it is detected that the third detection value falls within a range of a first interval, selecting the second detection value of the specific direction as the candidate value, and determining magnitude of the weighted value according to magnitude of the third detection value.

9. The method of claim 1, wherein the third detection value is equal to a median of the plurality of pixel values.

10. The method of claim 1, wherein the image is a Bayer pattern image.

11. An apparatus for performing de-noise processing, the apparatus comprising:

a processing circuit arranged to receive at least one image signal representing an image and perform de-noise processing on the image, wherein the processing circuit comprises:

a detection module, wherein with regard to each direction of a plurality of directions, the detection module sums up absolute values of differences between a plurality of sets of first pixel values around a target pixel of an image to generate a first detection value, and with regard to each direction of at least one portion of the directions, the detection module selectively averages at least one set of second pixel values around the target pixel to generate a second detection value, wherein each set of the sets of first pixel values comprises two pixel values corresponding to a difference, each set of the at least one set of second pixel values comprises two pixel values, two pixel values of a same set belong to a same color channel, and each set of first pixel values does not comprise a pixel value of the target pixel, and the detection module further sorts a plurality of pixel values around the target pixel and generates a third detection value accordingly, wherein the plurality of pixel values and the pixel value of the target pixel belong to a same color channel; and a de-noise module, wherein with regard to a specific direction of the directions, the de-noise module performs de-noise processing on the target pixel according to at least former two of the first detection value, the third detection value, and the second detection value.

12. The apparatus of claim 11, wherein with regard to each direction of the directions, the sets of first pixel values correspond to pixels on at least three straight lines arranged according to the direction.

13. The apparatus of claim 11, wherein with regard to each direction of the at least one portion of the directions, the at least one set of second pixel values corresponds to pixels on a straight line arranged according to the direction.

14. The apparatus of claim 11, wherein the de-noise module selects the specific direction from the directions according to the first detection value of each direction of the directions.

15. The apparatus of claim 11, wherein the de-noise module determines whether the third detection value falls within a range of a first interval; and when it is detected that the third detection value falls within the range of the first interval, the de-noise module performs de-noise processing on the target pixel according to the second detection value of the specific direction.

16. The apparatus of claim 15, wherein when it is detected that the third detection value falls within the range of the first interval, the de-noise module performs de-noise processing on the target pixel according to the second detection value of the specific direction; otherwise, the de-noise module performs de-noise processing on the target pixel according to the third detection value.

17. The apparatus of claim 11, wherein the de-noise module mixes a candidate value with the pixel value of the target pixel according to a weighted value to update the pixel value of the target pixel, in order to perform de-noise processing on the target pixel, and the candidate value is selected from the second detection value of the specific direction or the third detection value.

18. The apparatus of claim 17, wherein when it is detected that the third detection value falls within a range of a first interval, the de-noise module selects the second detection value of the specific direction as the candidate value, and determines magnitude of the weighted value according to magnitude of the third detection value.

19. The apparatus of claim 11, wherein the third detection value is equal to a median of the plurality of pixel values.

20. The apparatus of claim 11, wherein the image is a Bayer pattern image.

* * * * *